METHOD OF UNIFORMALLY AND RAPIDLY ETCHING NICHROME

Filed May 3, 1967 3 Sheets-Sheet 1

INVENTOR.
GERALD GARIES
BY Arthur L. Lessler
ATTORNEY

Feb. 9, 1971 G. A. GARIES 3,562,040

METHOD OF UNIFORMALLY AND RAPIDLY ETCHING NICHROME

Filed May 3, 1967 3 Sheets-Sheet 2

INVENTOR.
GERALD GARIES
BY Arthur L. Lessler
ATTORNEY

Feb. 9, 1971 G. A. GARIES 3,562,040

METHOD OF UNIFORMALLY AND RAPIDLY ETCHING NICHROME

Filed May 3, 1967 3 Sheets-Sheet 3

INVENTOR.
GERALD GARIES
BY Arthur L. Lessler
ATTORNEY

United States Patent Office 3,562,040

Patented Feb. 9, 1971

3,562,040

METHOD OF UNIFORMALLY AND RAPIDLY ETCHING NICHROME

Gerald A. Garies, San Mateo, Calif., assignor to International Telephone and Telegraph Corporation, a corporation of Delaware Filed May 3, 1967, Ser. No. 635,795

Int. Cl. C09k *3/00;* C23b *3/03*

U.S. Cl. 156—18 3 Claims

ABSTRACT OF THE DISCLOSURE

A process for fabricating a Nichrome thin film resistor as an integral part of a semiconductor integrated circuit. The Nichrome resistor is deposited on a layer of silicon dioxide grown or deposited on the semiconductor surface; aluminium contacts are deposited on the Nichrome resistance element and alloyed thereto.

BACKGROUND OF THE INVENTION

This invention relates to thin film resistance elements, and more particularly to novel processes for fabricating such elements and integrating the same with semiconductor devices.

Techniques for forming thin film resistance elements on insulating substrates are well known in the art. As heretofore practiced, these thin film techniques are generally employed in conjunction with the formation of thin resistive films on ceramic or other insulating substrates, the resistive film being first deposited on the substrate and subsequently etched, abraded or cut to form the desired element pattern, followed by tailoring of the resistance element to the desired value by abrading, cutting, anodizing or etching techniques. External connections are then made to the resistive element to form the final "thin film" passive structure. Alternatively, discrete semiconductor components may be bonded to the thin film network to form so-called "hybrid" structures.

In such prior art applications of thin film resistance techniques, dimensional tolerances are relatively noncritical in comparison with the extremely small dimensions of elements needed for utilization in conjunction with monolithic integrated circuitry. In such monolithic circuitry, dimensional tolerances of less than 10 microns are a common requirement. Since the ceramic or other insulating substrate generally employed in conjunction with the "thin film" and "hybrid" structures heretofore employed is relatively resistant to abuse in comparison with monolithic semiconductor devices, such "thin film" and "hybrid" structures may be fabricated by a wide variety of chemical and/or physical processes which could not be utilized in conjunction with monolithic circuitry without causing substantial deterioration of the semiconductor structure.

A particular need for such thin film resistors in conjunction with monolithic semiconductor devices is exhibited by the presently widespread technique of stabilizing the operation of power transistors by providing each said transistor with a plurality of active emitter segments, and interposing a resistive element in series with each said segment. By this means, equal current distribution over the entire active emitter area is thereby assured, eliminating the problem of "current hogging." Since the various resistive elements are effectively in parallel with each other, the resultant equivalent series emitter resistance is relatively small. Such series emitter resistance techniques are well known in the art and described, e.g., in the following copending patent applications assigned to the assignee of the instant application:

Ser. No. 240,366, now Pat. 3,286,138, filed Nov. 27, 1962; Ser. No. 282,398, now Pat. 3,358,197, filed May 22, 1963; Ser. No. 305,355 (now abandoned) filed Aug. 29, 1963; and Ser. No. 437,960, now Pat. 3,506,886, filed Mar. 8, 1965.

Accordingly, an object of the present invention is to provide improved processes for the fabrication of thin film resistance elements.

Another object of the invention to provide thin film resistor fabrication processes which enable extremely close dimensional tolerances to be maintained for the resistive elements formed thereby.

Another object of the invention is to provide thin film resistor fabrication techniques utilizing processes compatible with those employed in the manufacture of monolithic integrated semiconductor devices.

SUMMARY

These, and other objects which will become apparent by reference to the following detailed description taken in conjunction with the accompanying drawings and appended claims, are accomplished by the use of Nichrome (a registered trademark) as the thin film resistance material, said material being subject to novel photoetching processes, and subsequently employing novel alloyed contacts to said resistance material.

THE DRAWINGS

The invention will be best understood by reference to the following description taken in conjunction with the accompanying drawings, in which.

FIGS. 4 thru 11 show the steps involved in forming a strip lead transistor structure according to the invention.

DETAILED DESCRIPTION

In conventional techniques for fabricating thin film resistance elements, the resistive material is generally deposited as a layer upon an insulating substrate, typically a ceramic material. The resistive layer is then cut to the desired geometry by abrasion or acid etching methods. "Trimming" to the exact desired resistance value is accomplished by further cutting or abrasion, or by partial oxidation of the resistive material. These methods are not readily adaptable to the fabrication of thin film resistors upon semiconductor substrates and/or as an integral part of monolithic semiconductor devices, since (i) the resolution obtained by such abrasion or acid etching (generally with the use of a lacquer mask) methods is limited and (ii) difficulties are encountered in the formation of low resistance adherent contacts to the resistive layer.

The present invention is based in part upon the discovery that thin resistive films of Nichrome (a commercial alloy of nickel and chromium in the approximate relative proportions of 80% nickel-20% chromium) may be subjected to photoetching techniques, it being possible to obtain by the novel processes of my invention, resistive patterns having dimensional tolerances on the order of 5 microns or better.

Figure 1:
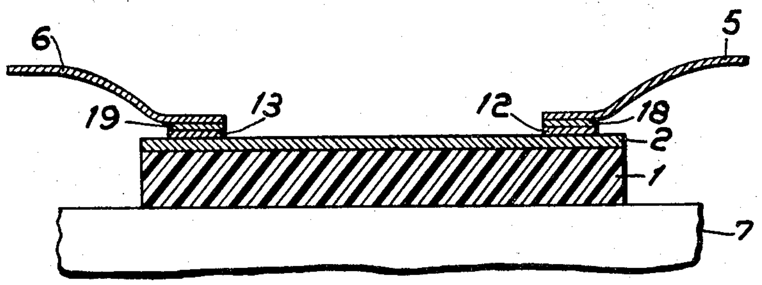
FIG. 1 shows a thin film resistor constructed in accordance with the novel process of the invention.
Figure 2:
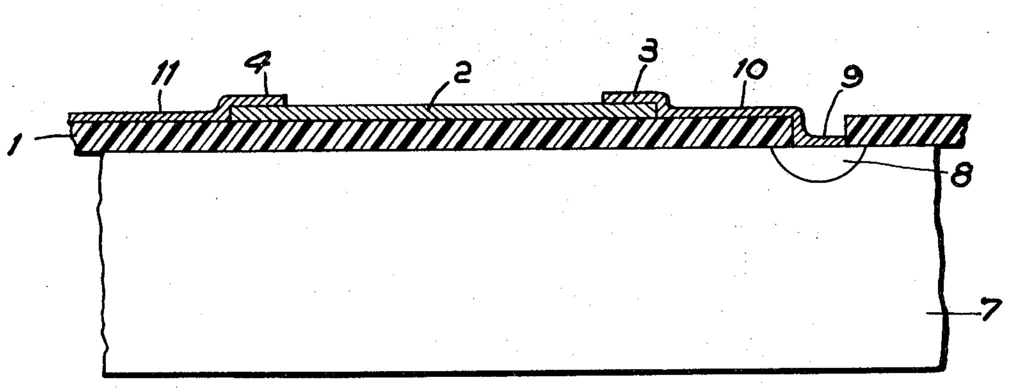
FIG. 2 shows a thin film resistor in accordance with the invention constructed as an integral part of a monolithic semiconductor device.

Referring to FIG. 1, and adherent layer 2 of Nichrome is initially vapor deposited onto an insulating base 1. The insulating base 1 may comprise, e.g., a ceramic material, or may alternatively be a thin layer of insulating material such as silicon dioxide deposited upon a semiconductive substrate 7, as shown in FIG. 2.

The Nichrome film 2 may be deposited by placing a Nichrome wire in the vicinity of the insulating base 1 and heating said wire to a temperature such that Nichrome evaporates from the wire and deposits on the insulating base 1. The insulating base 1 may or may not be heated. With the insulating base 1 heated to a temperature on the order of 300° C., Nichrome films having good adhesion are obtained (on a silicon dioxide insulating base) with thicknesses up to 1 micron. No tests were made beyond this thickness.

In order to obtain the particular geometrical shape desired for the resistor to be fabricated (for the particular application at hand, a rectangular configuration was desired), the entire Nichrome film 2 was coated with a thin layer of a photoresist material sold by Eastman Kodak, Inc., under the commercial designation KTFR. (Other photoresist materials, of the general types described in U.S. Pats. Nos. 2,610,120; 2,666,701; 2,670,285; 2,670,286; 2,670,287; 2,690,966; 2,691,584; 2,697,039; 2,725,372; 2,732,301; 2,739,892; 2,751,296 and 2,940,853, may also be used.) The photoresist layer was then exposed to ultraviolet radiation through a mask having a pattern corresponding to that of the resistance element to be formed. After exposure, the photoresist layer was immersed in a solution of KTFR Developer (a product of Kodak) followed by an immersion in xylene to remove all the photoresist material except that overlying the portion of the Nichrome film 2 which was to serve as the resistance element.

The entire structure was then immersed in a solution of a specially developed etchant in order to dissolve the exposed portions of the Nichrome film.

Two criteria were set for the selection of an etchant: (1) etch time in the 1 to 2 minute range, and (2) an etchant that does not affect the photoresist materials being used. In my mind the nitric acid based etchants would be unpredictable. Both sulphuric and chromic acid based etchants would react with the photoresist. Hydrochloric acid would require some form of oxidizing agent as does phosphoric acid. Etchants that may work are:

(1) A ferric chloride-hydrochloric acid solution.
(2) A sodium cyanide-ammonium persulfate solution.
(3) An oxalic acid-water solution.
(4) A copper sulfate-hydrochloric acid solution.

These are etchants that are used for metallographic purposes. None were tested since the etchant that was used readily met the five conditions noted in addition to etching within a two-minute period.

The desirable characteristics of any etchant to be used would be:

(1) An etchant that produces a pattern with good definition.

(2) An etchant that does not affect or react with the photoresist.

(3) An etchant that does not leave a residue that is deleterious and cannot readily be removed.

(4) An etchant that is readily adaptable to high volume production usage.

(5) With the Nichrome system, an etchant that does not preferentially etch the nickel or chromium.

The final etchant selected was (by volume):

5 parts phosphoric acid
5 parts deionized water
1.5 parts ferric chloride (60% solution)
0.1 gm./100 cc. wetting agent (a product designated as Fluorochemical FC95 by Minnesota Mining and Manufacturing Company)
Temperature—60° C.
Etch time—75 to 90 seconds In the development of the etchant it was found:

(1) A 1:1 phosphoric acid-water mix did not etch with good definition within 10 minutes. Heating the solution did not reduce etch time appreciably.

(2) With the ferric chloride addition, the etchant is capable of producing the definitions required. Increasing the ferric chloride concentration reduces etching time but introduces bubble formations on the surface being etched. This effect leads to material being removed in round patterns.

(3) Increasing the etching temperature, as expected, decreased the etch times, and increased the bubble formation which in turn increased the round pattern etching to the point that the photoresist was affected.

(4) The addition of the wetting agent inhibited the bubble formation and decreased the etch times due to increased surface wetting. This addition produced an etching rate that yielded the definition desired. Line widths of 5 microns were obtained by the foregoing techniques. Any wetting agent commonly used in the semiconductor industry should work. The only purpose of the wetting agent is to reduce the surface tension between the etchant and the material to be etched permitting the etchant to wet the material to be etched. The FC95 was used because it was readily available in the lab.

This etchant tends somewhat to preferentially etch the deposited Nichrome film. The evaporating and condensing characteristics of the Nichrome are such that the chromium evaporates at a lower level than the nickel. This may produce a concentration gradient through the thickness of the deposit. The etchant preferentially attacks the nickel rich area of the deposit over the chromium rich area. This effect can produce resistors of varying values and may be considered detrimental. Increased deposition rates will reduce the concentration gradients and tend to alleviate this difficulty.

Since photoresist techniques are used to obtain the Nichrome pattern, the photoresist must be removed after etching. It was found that KTFR could be removed by a 2-minute soak in a cold solution of concentrated chromic acid solution without affecting the Nichrome film.

Although the foregoing describes the etchant composition preferred, deviations from the proportions set forth are permissible as follows:

2 to 8 parts phosphoric acid; 8 to 2 parts deionized water; .5 to 2.5 parts ferric chloride (40 to 80% solution); .1 to .5 gram per 100 cc. wetting agent; temperature 25 to 95° C.; etch time 10 seconds to 10 minutes.

Again referring to FIG. 1, after the Nichrome layer has been etched to form the desired resistance element geometry, it is necessary to form low resistance contacts to the Nichrome film 2. This is accomplished by first vapor depositing aluminum contact areas 12 and 13 on selected parts of the Nichrome film 2. The aluminum contact areas 12 and 13 may, e.g., be deposited by vacuum evaporation through a metal mask placed on the surface of the Nichrome film. The aluminum may also be deposited over the entire surface and the patterns or contact areas obtained by photoresist and etching techniques. In this case an etchant must be selected for the aluminum that does not react with the Nichrome. The thickness of the aluminum contact areas is preferably on the order of 0.5 micron.

After deposition, the aluminum contact areas 12 and 13 are alloyed to the Nichrome film 2 by (i) heating in a vacuum at 650±5° C. for 2 to 3 minutes or (ii) heating in a nitrogen atmosphere at 567±5° C. for 5 to 6 minutes. Preferably, vacuum alloying at 655° C. for approximately 2 minutes or nitrogen atmosphere alloying at 567° C. for 5 minutes is employed. Resistance measurements between the aluminum contact areas 12 and 13 showed that the measured resistance shifted during the alloying process. Tests using actual devices showed the following resistance shifts, for nitrogen furnace alloying at 567° C., between the values measured after aluminum contact deposition and after alloying:

Table I.—Resistance (ohms)

| Deposited: | Alloyed |
|---|---|
| 11 | 21–23 |
| 26 | 30–33 |
| 48 | 40–45 |
| 75 | 50–55 |

Microscopic examination of resistance elements after alloying showed a definite metallurigical reaction occurring between the Nichrome and the aluminum at the interface therebetween. The aluminum-Nichrome interface appeared to be a homogeneous alloy that had been formed as a result of the thermal cycle employed. This alloying produces a contact that is ohmic in nature. Since the temperatures attained during the alloying are below the lowest eutectic point of any aluminum-nickel, aluminum-chromium or aluminum nickel-chromium composition, the reaction product therefore is probably due to a diffusion mechanism. There is no doubt that a reaction between the aluminum and Nichrome occurs. This is evidenced in the change of structure that is readily apparent when viewed under low magnification. Cross sections of devices through the reacted area were made by both standard metallographic techniques and by a technique known as "angle lapping." This is a technique used to determine diffusion depths in devices. Neither technique produced results that could be used to determine the character of the microstructure of the deposited film.

For some applications, such as the configuration shown in FIG. 2 wherein metallized interconnections of aluminum 10 and 11 having corresponding contact areas 3 and 4 alloyed to the Nichrome resistance element 2 are employed, it is not necessary that the contacts to the resistance element be soft solderable. In many cases, however, it is desired to interconnect the resistance element 2 with other structures by means of conductors which are soft soldered to the aluminum contact areas 12 and 13 (FIG. 1). In such cases, it is necessary to form soft solderable contact layers atop the aluminum contact areas 12 and 13 (aluminum is not soft solderable). It is very difficult to apply a soft solder directly to aluminum. Usually elaborate techniques are required to accomplish this. The key to the ability to forming aluminum-based soft solderable connections readily, in accordance with my invention is the alloy that is formed between the aluminum, nickel and chromium. Apparently the very tenacious oxide associated with aluminum is removed during the alloying operation permitting a surface to be exposed that one can work with.

Referring to FIG. 1, I have discovered that the aluminum-Nichrome alloy that is formed during the previously mentioned alloying step can be nickel plated with good adherence. Accordingly, soft solderable contact areas 18 and 19 are formed by first nickel plating layers on the contact areas 12 and 13 and subsequently applying thick layers of gold plate on said nickel layers. This composite structure insures good adherence to the aluminum-Nichrome alloy contact areas, and good soft solderability characteristics due to the thick overlying gold plate. Wires 5 and 6 may then be soft soldered to the gold plated areas.

Alternatively, thermo-compression bonds can be made directly to the aluminum contact areas 12 and 13.

Tests made by dipping the Nichrome resistance element 2, having alloyed aluminum contact areas 12 and 13 formed thereon, in a molten tin solder pot revealed that in the areas where alloying between the Nichrome and aluminum had occurred, there was good adherence between the Nichrome film 2 and the siilcon dioxide insulating base 1, and the aluminum-Nichrome alloyed surface tended to be wettable by the tin solder. The solder composition employed was virtually 100% tin. Any lead-tin solder would also be suitable.

Accordingly, an alternative soft solderable resistance element was fabricated according to the following technique.

Figure 3:
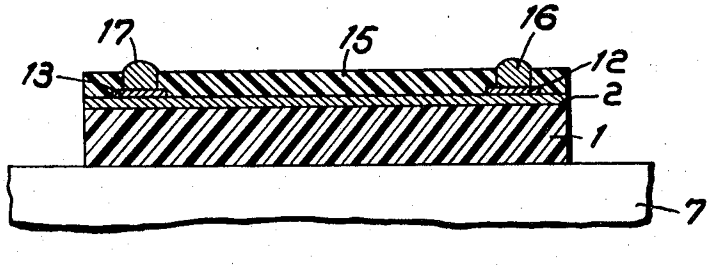
FIG. 3 shows an alternative embodiment of the resistor shown in FIG. 1.

Referring to FIG. 3, the Nichrome resistance element 2, disposed on the silicon dioxide insulating base 1, was photoetched to the desired geometry using the techniques previously described. Aluminum contact areas 12 and 13 were deposited on the surface of Nichrome resistance element 2 by vacuum evaporation through a metal mask, and subsequently alloyed to the Nichrome element by heating at 567° C. in a nitrogen atmosphere for approximately 5 minutes. An additional silicon dioxide insulating layer 15 was subsequently deposited on the entire surface of the resistance element, employing a conventional low temperature pyrolytic decomposition technique, and subsequently photoetched to expose portions of the aluminum contact areas 12 and 13.

The structure was then dipped into a molten tin solder pot and removed, resulting in solder blobs 16 and 17 exhibiting good adherence to the alloyed contact areas 12 and 13. The resultant structure, as shown in FIG. 3, is susceptible of interconnection with other elements by soft soldering of wires to the solder blobs 16 and 17. Alternatively, the contacts 16 and 17 may be formed by electroless plating of a suitable metal such as gold, the plated metal adhering only to the contact areas 12 and 13.

As previously mentioned, the techniques described herein are well suited for utilization in conjunction with monolithic devices. For example, it is common practice to employ a protective oxide film (or other suitable insulating layer) on the surface of a monolithic semiconductor device in order to protect said surface from deleterious components in the surrounding atmosphere. In the case of a silicon semiconductor substrate, shown as 7 in the figures, a silicon dioxide insulating layer 1 may conveniently serve as the insulating base for the Nichrome resistance element 2. The silicon dioxide layer may be thermally or pyrolytically deposited by well known semiconductor processing techniques.

FIG. 2 shows a preferred method of "integrating" a thin film Nichrome resistance element 2, manufactured according to my novel process, with a monolithic semiconductor device consisting of a semiconductive (silicon, for example) substrate 7 of one conductivity type having an active region 8 of opposite conductivity type disposed therein, with a P-N junction between said substrate and said active region. The active region 8 may, for example, comprise the emitter region of a transistor, it being desired to place the resistance element 2 in series with said active emitter region in order to stabilize the emitter current.

Again referring to FIG. 2, a silicon dioxide insulating base 1 is first deposited, for example by thermal oxidation, upon the upper surface of silicon substrate 7. A layer of Nichrome 2 is then vacuum evaporated to the desired thickness upon the insulating base 1. The Nichrome film 2 is then photoetched, utilizing the techniques previously described, to the desired geometry. During this photoetching process, the insulating base 1 protects the semiconductor surface. If desired, a relatively large Nichrome pad coplanar with the resistance element 2 could be provided to thereafter form one of the "low resistance" contacts to the Nichrome element 2.

The next step is to photoetch an aperture in the insulating base 1 thereby exposing a surface portion of the active region 8. Next, by use of a suitable mask, aluminum conductors 10 and 11 are deposited to interconnect the Nichrome resistance element 2 with other areas of the semiconductor device. The aluminum conductor 10 has an end portion 9 which forms a contact area to the active region 8, and an opposite end portion 3 forming a contact area to the Nichrome resistance element 2. Similarly, aluminum conductor 11 has an end portion 4 contacting the Nichrome element 2.

It should be understood that the effective resistance between contact areas 3 and 4 may be adjusted by varying the size of said contact areas and the spacing therebetween. The choice of such contact area parameters, as well as the Nichrome resistance element geometrical dimensions, should take into account the resistance shift which takes place during subsequent alloying of the aluminum contact areas 3 and 4, as exemplified by Table I.

The aluminum contact areas 3 and 4 are now alloyed to the Nichrome element 2 by placing the device in a nitrogen furnace and heating for approximately 5 minutes at a temperature of about 567° C. During this alloying process, the aluminum area 9 forms a good bond with the semiconductor active region 8.

Instead of employing an aluminum conductor 10, a Nichrome contact pad of large area formed at the same time as Nichrome resistance element 2 may be employed for this purpose. In the event that active region 8 represents one of a plurality of emitter "fingers" of a high power transistor, the aluminum conductor 11 may comprise a bus bar interconnecting one end of each corresponding resistance element 2.

A technique for fabricating a soldered strip lead transistor structure which combines the arrangements of FIGS. 2 and 3, is shown in FIGS. 4 thru 11. A description of the steps involved in forming this structure is set forth below.

Figure 4:
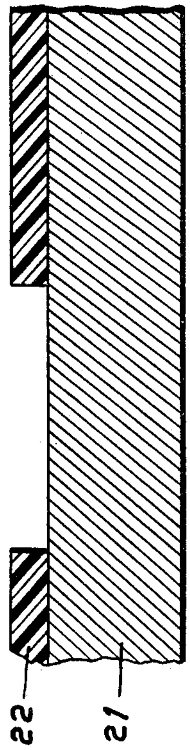

FIG. 4.—The raw material 21 (silicon) is thermally oxidized and a silicon dioxide layer 22 formed. An opening is made in the silicon dioxide by photoresist and etching techniques.

Figure 5:
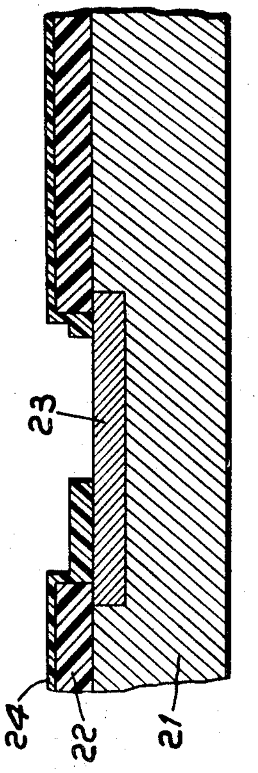

FIG. 5.—The base region 23 is diffused and another silicon dioxide layer 24 is thermally grown over the diffused base region. An opening is made in this layer.

Figure 6:
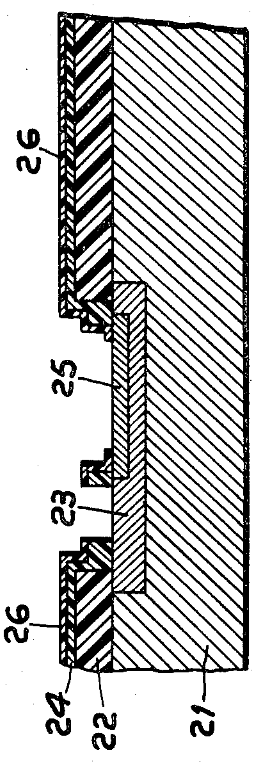

FIG. 6.—The emitter region 25 is diffused and a third silicon dioxide layer 26 is thermally grown over the diffused emitter region. Openings are made over both the emitter and the base regions by etching the oxides.

The process to this point is standard for most planar transistors.

Figure 7:
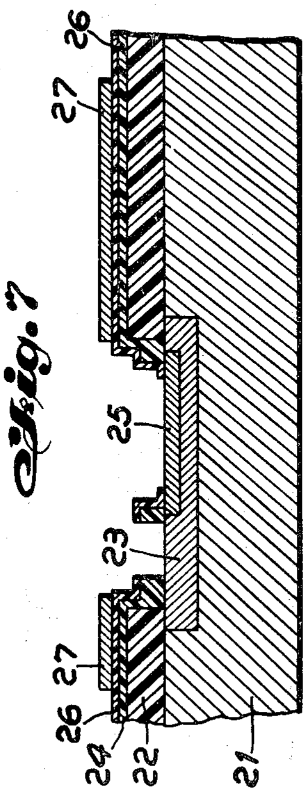

FIG. 7.—A Nichrome resistive film 27 is deposited over entire surface and is etched to desired geometry using photo-resist techniques.

Figure 8:
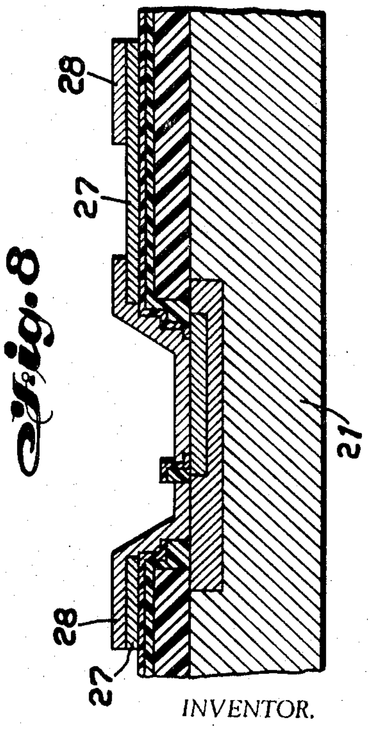

FIG. 8.—An aluminum contact film 28 is deposited over the entire surface and is etched to desired geometry. The deposited films are then alloyed.

Figure 9:
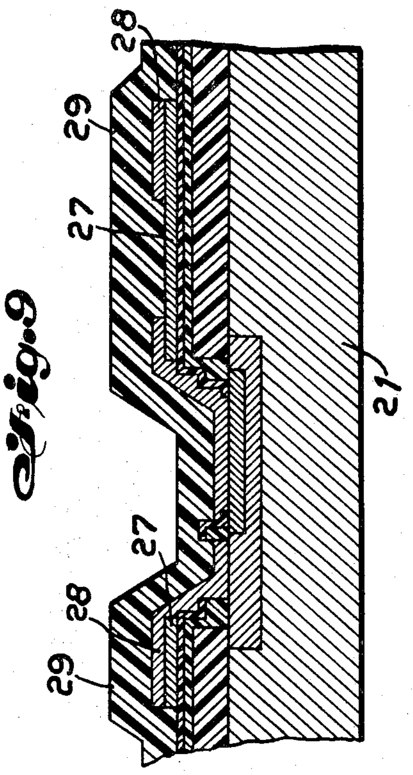

FIG. 9.—A low temperature silicon dioxide 29 (or silicon nitride) is deposited over the entire surface.

Figure 10:
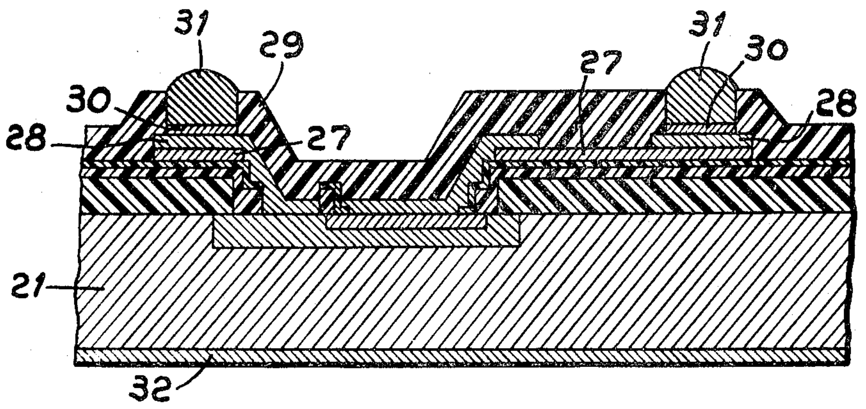

FIG. 10.—The low temperature oxide 29 is etched over the alloyed aluminum-Nichrome contact areas 27 and 28. A nickel layer 30 is plated followed by either a solder dip or a gold plate 31. The gold plate is preferred. Any other material capable of being electroless plated may be used. A gold layer 32 is deposited and alloyed onto the back of the device.

Figure 11:
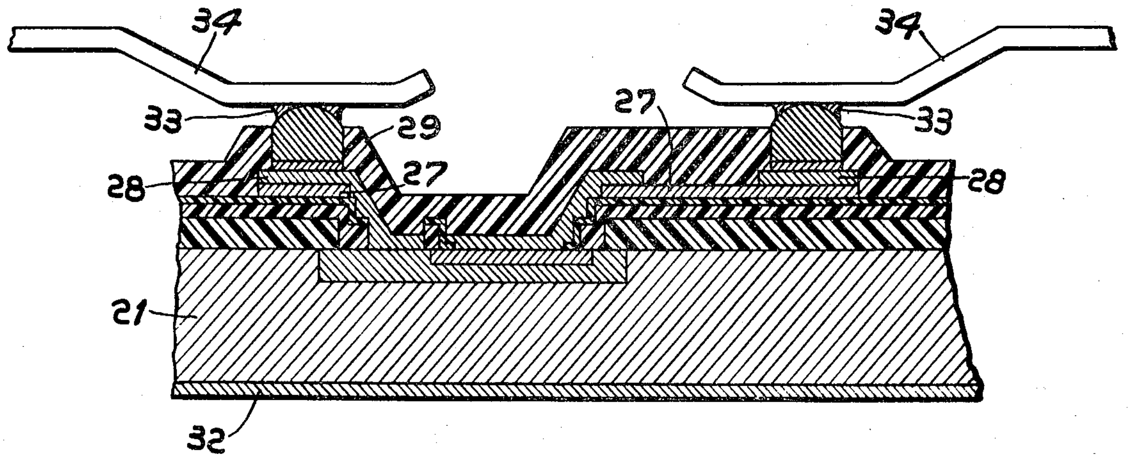

FIG. 11.—The devices are diced from the wafer and attached to a mounting base using a gold-antimony solder. The one area that needs refining is the vaporization or deposition of a solder-like material on the back of the die that can be used in die attaching. Strip leads 34 are then soldered to the gold plated areas on the top of the die using any solder 33 that melts under 350° C.

If desired, the Nichrome resistance element 2 may be protected by coating with a suitable passivating layer of insulating material. However, tests have indicated that the Nichrome element is in any event quite resistant to surface oxidation, so far as change in the resistance exhibited between contact areas 3 and 4 is concerned.

While the principles of the invention have been described above in connection with specific embodiments, and particular modifications thereof, it is to be clearly understood that this description is made only by way of example and not as a limitation on the scope of the invention.

What is claimed is:

1. A method of uniformally etching a film comprising a homogeneous binary alloy of approximately 80% nickel and approximately 20% chromium at a rate greater than .5 micron per minute comprising the step of subjecting said film to an etching solution consisting essentially of:

2 to 8 parts by volume of phosphoric acid;
8 to 2 parts by volume of water;
0.5 to 2.5 parts by volume of a solution 40% to 80% ferric chloride in water; and
a wetting agent capable of reducing the surface tension between said solution and said film.

2. A method of uniformally etching a film according to claim 1 wherein said film is selectively etched to produce a resistor having a predetermined value.

3. A method according to claim 1, wherein said particular etchant comprises a volumetric mixture of: 5 parts phosphoric acid; 5 parts water; 1.5 parts of a solution of 60% ferric chloride in water; and 0.1 gram of said wetting agent being added to each 100 cubic centimeters of said mixture.

References Cited

UNITED STATES PATENTS

| | | | |
|---|---|---|---|
| 3,449,828 | 6/1969 | Solberg et al. | 29—620 |
| 3,253,968 | 5/1966 | Shepher, Jr., et al. | 156—18X |
| 3,232,802 | 2/1966 | Young, Jr., et al. | 156—18 |
| 3,057,765 | 10/1962 | La Boda et al. | 156—18 |
| 2,806,000 | 9/1967 | Streicher. | |
| 3,401,055 | 9/1968 | Langdon et al. | 317—234 |
| 3,383,255 | 5/1968 | Rossi et al. | 156—17 |
| 3,345,210 | 10/1967 | Wilson | 117—212X |
| 3,266,127 | 8/1966 | Harding et al. | 29—590X |
| 3,217,401 | 11/1965 | White | 317—234 |
| 3,197,341 | 7/1965 | Wallace | 252—79.2X |
| 3,074,836 | 1/1963 | Sherer et al. | 156—8 |
| 2,871,110 | 1/1959 | Stead | 252—79.3 |

OTHER REFERENCES

IBM Technical Disclosure Bulletin: Buccaro, B. G.; Castrucci, P. P.; Mason, J. W. "Sintered Aluminum Contacts for Semiconductor Devices," vol. 9, No. 6, November 1966.

ALFRED L. LEAVITT, Primary Examiner

A. GRIMALDI, Assistant Examiner

U.S. Cl. X.R.

117—212; 252—79.3, 79.4